United States Patent
Akieda et al.

(12)

(10) Patent No.: US 6,448,367 B1
(45) Date of Patent: Sep. 10, 2002

(54) METHOD OF PRODUCING POLY(P-DIOXANONE), POLY (P-DIOXANONE) MONOFILAMENTS AND METHOD FOR PRODUCING THE SAME

(75) Inventors: Hideyuki Akieda, Chiba; Yoshikatsu Shioya, Aichi; Minoru Kajita, Aichi; Kazuhiro Ozu, Aichi, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/830,988

(22) PCT Filed: Sep. 12, 2000

(86) PCT No.: PCT/JP00/06223

§ 371 (c)(1),
(2), (4) Date: May 3, 2001

(87) PCT Pub. No.: WO01/19891

PCT Pub. Date: Mar. 22, 2001

(30) Foreign Application Priority Data

Sep. 13, 1999 (JP) ............................................. 11-258262

(51) Int. Cl.$^7$ .............................................. C08G 63/08
(52) U.S. Cl. .................. 528/354; 528/502 R; 528/486; 528/501; 528/503; 428/364
(58) Field of Search ............................. 528/354, 502 R, 528/486, 501, 503; 428/364

(56) References Cited

U.S. PATENT DOCUMENTS 4,052,988 A * 10/1977 Doddi et al. ............. 128/335.5
4,643,191 A    2/1987 Bezwada et al.

FOREIGN PATENT DOCUMENTS

EP    0225163    6/1987
JP    62-164718    7/1987

* cited by examiner

Primary Examiner—Duc Truong
(74) Attorney, Agent, or Firm—Burns, Doane, Swecker & Mathis, L.L.P.

(57) ABSTRACT

The ring opening polymerization of p-dioxanone is started in a liquid phase under stirring at a temperature of 85 to 105° C. after adding 0.002 to 0.005 mol percent of stannous 2-ethylhexanoate forming a white crystal at a temperature of 0° C. as a catalyst and 0.01 to 0.1 mol percent of initiator. Stirring is stopped when a stirring load has increased by 10 to 100 percent over an initial load, while the temperature is lowered to a range of 65 to 85° C., to continue the polymerization in a solid phase to produce poly(p-dioxanone). The polymer is used to make a monofilament having a knot tensile strength of at least 30,000 psi and a strength retention of at least 58 percent after four weeks of immersion in a physiological saline solution at 37° C. The monofilament provides an absorbable surgical suture which is highly resistant to hydrolysis and very useful for stitching a wound or incision which requires a long time for healing.

10 Claims, No Drawings

METHOD OF PRODUCING POLY(P-DIOXANONE), POLY (P-DIOXANONE) MONOFILAMENTS AND METHOD FOR PRODUCING THE SAME

BACKGROUND OF THE INVENTION

1. Field of the Invention

This invention relates to a method of producing poly(p-dioxanone), poly(p-dioxanone) monofilaments and a method of producing the same. More particularly, this invention relates to poly(p-dioxanone) monofilaments which can retain high mechanical properties for a long time and are suitable for use as surgical sutures, a method of producing the same, and a method of producing poly(p-dioxanone) which is suitable for use as a raw material for such monofilaments.

2. Background Art

The poly(p-dioxanone) monofilaments commercially available as PDSII (tradename) from Ethicon, Inc. of U.S.A. are known as having a very high resistance to hydrolysis. Monocryl (tradename of Ethicon), Maxon (tradename of ACC), Biosyn (tradename of U.S. Surgical). etc. are known as other synthetic monofilament sutures. The latter monofilaments are hydrolyzable more quickly than PDSII, and are not effective for applications calling for a longer period of resistance to hydrolysis, but are used only for short-term applications. It has been necessary to use polycaprolactone monofilaments, etc. for applications calling for a longer period of hydrolysis resistance. As a matter of fact, however, they have hardly been used, since they are insufficient in heat resistance and are too slow in hydrolysis.

The recent progress in medical treatment has brought about a growing population of elderly people. They, however, require a long time for healing because of their advanced age, and sutures which require extraction are used for those people, since ordinary decomposable monofilament sutures become lower in strength before the healing of a wound or incision. There has been a demand for monofilament sutures which are more resistant to hydrolysis and higher in safety.

Doddi et al. produce absorbable monofilaments of poly (p-dioxanone). See e.g. Japanese Patent Publication No. 36785/1985 and U.S. Pat. No. 4,052,988. Japanese Patent Application Laid-Open No. 316745/1998 discloses a method of producing poly(p-dioxanone) having a high molecular weight and a narrow molecular weight distribution (Mw/Mn). The former monofilaments are described as having a molecular weight controlled by the amount of an organic metal catalyst and the monomer purity and providing sutures having a viscosity of at least 0.5 dl/g in a tetrachloroethane solution. An increase in molecular weight, however, results in a higher catalyst content and cannot be said to be a good method from a safety standpoint, even if the catalyst may be removed later. The latter polymer also has its molecular weight controlled by the amount of stannous 2-ethylhexanoate and has a catalyst content far from what is intended by the inventor of this invention. It cannot be said to be a good method from a safety standpoint even if the catalyst may be removed.

Japanese Patent Application Laid-Open No. 52205/1996 discloses a method of producing poly(p-dioxanone) having a high solution viscosity and surgical monofilaments having a viscosity of 2.3 to 8.0 dl/g in a solution containing hexafluoroisopropanol as a solvent. It also states that poly (p-dioxanone) can be produced by a one-step process of polymerization in which a reactor suited for a polymer of high viscosity is employed, or by a two-step process in which a prepolymer having a low molecular weight is subjected to two steps of polymerization in a solid state. It further states that the contents of the reactor are discharged onto a curing tray when there has been obtained a polymer having a viscosity of 100 to 500 cp. The resulting polymer certainly has a high molecular weight (an intrinsic viscosity of 2.64 dl/g), and an increase in molecular weight is intended for obtaining a somewhat improved resistance to hydrolysis. There is, however, no specific statement showing the resistance of filaments to hydrolysis, but there is only a statement of the results obtained from an injection molded product having a high molecular weight. Moreover, there is no statement at all about e.g. the deterioration of the polymer resulting by shearing from stirring, but the combination of polymerization in a liquid phase under stirring and polymerization in a solid phase is rather considered as being employed for an efficient transfer.

Known methods of producing monofilaments are disclosed in Japanese Patent Application Laid-Open No. 206143/1991, U.S. Pat. Nos. 5,294,395 and 5,451,461, etc. More specifically, there is disclosed a method in which the monofilament to be drawn after spinning has its skin layer exposed to heat at a temperature above its melting point to produce a monofilament-having a two-layer crystal structure differing between its skin and core. This method is commonly known as a zone drawing method, and is characterized by melting the skin to some extent and imparting softness to it, while maintaining a high crystallinity in the core, and thereby keeping the filament hydrolyzable. The method, however, requires the use of poly(p-dioxanone) having a high molecular weight as a raw material for the filament, since it is partly caused to undergo thermal decomposition. It cannot be considered as a good method from an economical standpoint, either, since it involves a complicated process and requires special equipment. Moreover, it is considered as sacrificing the hydrolysis resistance of the polymer. Thus, it is understood that it is necessary to produce a polymer having a high molecular weight suitable for zone drawing.

Under these circumstances, it is an object of this invention to provide monofilaments of poly(p-dioxanone) which are superior in hydrolysis resistance and safety to the known products such as PDSII, a method of producing the same and a method of producing poly(p-dioxanone) which is useful as a raw material therefor.

DISCLOSURE OF THE INVENTION

As a result of our careful study, we, the inventors of this invention, have unexpectedly found as a basis for our invention that stannous 2-ethylhexanoate which has hitherto been believed as a liquid forms a solid at a low temperature upon purification by distillation, etc., and that if the ring opening polymerization of p-dioxanone is started in a liquid phase by using stannous 2-ethylhexanoate of high purity as a catalyst, and is switched over to polymerization in a solid phase at a lower temperature by stopping stirring when the viscosity of the product of polymerization reaction (or its stirring load) has increased above a specific level, there is obtained poly(p-dioxanone) giving a spun filament which is superior in hydrolysis resistance to any polymer obtained by using an unpurified catalyst, though both of the polymers have an equal molecular weight. Thus, the invention has been achieved.

According to a first aspect of this invention, there is provided a method of producing poly(p-dioxanone) by the ring opening polymerization of p-dioxanone in the presence of a catalyst and an initiator, which comprises starting the ring opening polymerization of p-dioxanone in a liquid phase under stirring at a temperature of 85 to 105° C. after adding 0.002 to 0.005 mol percent of stannous 2-ethylhexanoate forming a white crystal at a temperature of 0° C. as the catalyst and 0.01 to 0.1 mol percent of initiator thereto, and stopping stirring when a stirring load has increased by 10 to 100 percent over an initial load, while lowering the temperature to a range of 65 to 85° C., to continue the polymerization in a solid phase.

After the polymerization in a solid phase, an inert gas is preferably supplied at a temperature of 60 to 80° C. and a pressure not exceeding 10 mm Hg to remove unreacted p-dioxanone so that there may be obtained a polymer having an unreacted p-dioxanone content not exceeding 0.5 percent by weight, and the polymerization is preferably continued until a conversion of at least 95 percent by weight to poly(p-dioxanone) is attained. In either event, it is preferable to use p-dioxanone having a water content not exceeding 150 ppm. It is preferable to use stannous 2-ethylhexanoate having a melting point of −3° C. or higher in addition to the property stated above, and moreover, it is preferable to use a distillate obtained by distilling a commercially available stannous 2-ethylhexanoate at a pressure of 0.25 to 0.3 mm Hg and a column top temperature of 180 to 200° C. It is preferable to stop stirring when the stirring load has increased by 20 to 80 percent over the initial load. The intrinsic viscosity of poly(p-dioxanone) produced by the method as described is variable by adjusting the amount of the initiator, and is specifically from 1.8 to 2.5 dl/g at 25° C. The melting point of stannous 2-ethylhexanoate can be measured by the method which will be described in connection with the examples.

According to a second aspect of this invention, there is provided a method of producing a monofilament of poly(p-dioxanone) which comprises the steps of (1) melt spinning poly(p-dioxanone) at a temperature of 125 to 165° C., (2) drawing a spun filament in a draw ratio of 3 to 8 at a temperature of 60 to 110° C., (3) relaxing it by 80 to 90 percent at a temperature of 60 to 110° C., and (4) heat treating it at a temperature of 80 to 100° C. for a period of 1 to 24 hours. There is produced a drawn monofilament having a diameter of 4 to 40 mils. The polymer employed is a product of the method according to the first aspect of this invention.

According to a third aspect of this invention, there is provided a monofilament of poly(p-dioxanone) having a knot tensile strength of at least 30,000 psi, and a strength retention of at least 58 percent as determined after four weeks of immersion in a physiological saline solution at a temperature of 37° C. The monofilament is produced by the method according to the second aspect of this invention, and is suitable for use as a surgical suture.

The poly(p-dioxanone) monofilament according to this invention is hydrolyzedmore slowly than any known hydrolyzable polyester filament, such as PDSII. It is superior in hydrolysis resistance, as it retains its knot tensile strength, etc. at a high percentage even after its hydrolytic treatment in a physiological saline solution. Therefore, it is a very useful material which can be used as a surgical suture for a wound or incision requiring a long time for healing.

BEST MODE OF CARRYING OUT THE INVENTION

The present invention will hereinafter be illustrated in detail.

Description will first be made of a method of producing poly(p-dioxanone). According to the method of this invention, stannous 2-ethylhexanoate forming a white crystal at a temperature of 0° C. is used as a catalyst for the ring opening polymerization of p-dioxanone, and its ring opening polymerization is started at a specific temperature in a liquid phase under stirring. A stirring load is employed as a measure for the viscosity of a reaction mixture, and when the stirring load has increased above a specific value, the stirring of the reaction mixture is stopped to discontinue its mechanical shearing, and its ring opening polymerization is continued in a solid phase at a lower temperature.

This invention employs stannous 2-ethylhexanoate as the catalyst. Stannous 2-ethylhexanoate is approved as a food additive by the U.S. Food and Drug Administration. The compound used for the purpose of this invention is of the type forming a white crystal at a temperature of 0° C., and preferably has a melting point of −3° C. or higher. It can be obtained by purifying a commercially available product by e.g. distillation. Nikka Octic Tin 28 Percent is the tradename of a commercially available product of Nippon Kagaku Sangyo Co., Ltd. It is a light yellow liquid at a temperature of 0° C. If it is purified by distillation at a pressure of 0.25 to 0.3 mm Hg and a column top temperature of 180 to 200° C., a catalyst having the purity which is suitable for the purpose of this invention is obtained as a distillate at a yield of about 80 percent by weight. The distillate obtained at a column top temperature below 180° C. is removed as a forerun, and the distillate obtained at a column top temperature above 200° C. is removed as a still residue. The purified product is a colorless viscous liquid at a normal temperature, forms a white crystal at a temperature of 0° C. in a nitrogen atmosphere, and has a melting point of −30° C. The $^1$H-NMR and IR analysis of the first fraction indicates that the greater part thereof consists of free carboxylic acids. The catalyst is preferably used in the amount of 0.002 to 0.005 mol percent relative to a charge of p-dioxanone.

The initiator may be selected from aliphatic alcohols, glycols, hydroxycarboxylic acids, phenols, etc. Specific examples are saturated aliphatic alcohols including methanol, ethanol, propanol, butanol, amyl alcohol, capryl alcohol and lauryl alcohol, alicyclic alcohols including cyclopentanol and cyclohexanol, glycols including diethylene glycol, hydroxycarboxylic acids including lactic and glycolic acids, and phenols including aminophenol and acetaminophenol. Lauryl alcohol is, among others, preferred. The initiator is preferably used in the amount of 0.01 to 0.1 mol percent relative to a charge of p-dioxanone.

The p-dioxanone (monomer) used for the purpose of this invention may be a distilled product, or a distilled and purified one, and preferably has a low water content. Its allowable water content is preferably not higher than 150 ppm. If its water content exceeds 150 ppm, it is likely that poly(p-dioxanone) having a high rate of hydrolysis may be formed in a large proportion as a result of the predominant formation of the polymer which is initiated by water.

A dye may be added to the reaction mixture preferably at the time when its polymerization is started. Examples of the dyes which can be employed are D & C, Green No. 6 (CAS No. 128-80-3) and D & C, Violet No.2 (CAS No. 81-48-1) as specified by U.S. CFR 21. The former dye may be added in the amount of preferably less than 0.21 percent, and more preferably less than 0.15 percent, by weight, and the latter in the amount of preferably less than0.3 percent, and more preferably less that 0.25 percent, by weight. The addition of any such dye in a larger amount results in a prolonged reaction time and a prolonged stirring time, though there is hardly any shearing by stirring, if the reaction mixture is of the same viscosity. The addition in a smaller amount is not good for hydrolysis resistance as a result of shearing.

According to this invention, it is possible to produce a polymer and a filament which are highly resistant to hydrolysis, even if no dye may be added. It is possible to attain the object of this invention by using a purified catalyst, effecting an operating control based on a stirring load and carrying out a liquid-phase reaction at a high temperature and a solid-phase reaction at a low temperature, as stated before.

The ring opening polymerization of p-dioxanone is carried out in the presence of a catalyst and an initiator with a dye as required. The reaction is started in a liquid phase under stirring at a temperature of from 85 to 105° C. and preferably from 90 to 100° C. As the reaction proceeds with the growth of a polymer, the reaction mixture has an increased viscosity. According to this invention, such an increase in viscosity is detected as an increase in stirring load.

The stirring load will be explained with reference to a case in which a 300 ml reactor having an inside diameter of 87 mm and a depth of 170 mm contains a liquid reaction mixture having a depth equal to 90 percent of that of the reactor, and is equipped with a stirring blade having a length (L) which is 0.6 to 0.7 time as large as the inside diameter (D) of the reactor. If stirring is started at an initial load of 0.006 V (the stirrer has a maximum load of 5 V and a corresponding torque of 10 kgf·cm) during the beginning of the reaction, the point of time at which there has been a stirring load exceeding, for example, 0.008 V is defined as the point of time at which be viscosity has occurred, or there has been an increased stirring load. The increase in this case is 0.002 V, or 33 percent over the initial load. The polymerization proceeds at a temperature of 85 to 105° C. and preferably in the range of 90 to 100° C.

According to this invention, stirring is stopped when a specific increase in stirring load has resulted from the occurrence of viscosity, and the temperature is lowered to start the solid-phase polymerization. The solid-phase polymerization is started when there has been an increase of 10 to 100 percent, and preferably 20 to 80 percent, in stirring load over the initial value. The solid-phase polymerization is carried out at a temperature of from 65 to 85° C. and preferably from 70 to 80° C.

The polymerization reaction is preferably continued until the monomer shows a conversion of at least 95 percent by weight. The reaction time depends on the temperature and the amounts of the catalyst and initiator employed, but it is usually preferable for the liquid-phase reaction under stirring to continue for a period of, say, from 2 to 24 hours, more preferably from 6 to 12 hours. A greatly improved operating efficiency can be achieved by employing a control system for detecting an increased stirring load automatically, stopping stirring automatically and starting the solid-phase polymerization automatically. The solid-phase polymerization is preferably continued for a period of, say, three to six days. A longer period is undesirable from operating and economical standpoints and a period shorter than three days is likely to result in the failure to attain the intended conversion and thereby the difficulty in producing a polymer which can make a spun monofilament having the desired properties. While an oil bath or a dryer may be used as a heating medium, the latter is preferred from an efficiency standpoint.

The poly(p-dioxanone) produced by the method as described has an intrinsic viscosity of 1.8 to 2.5 dl/g and preferably in the range of about 1.9 to 2.4 dl/g at 25° C. A polymer having an intrinsic viscosity below 1.8 dl/g has too low a melt viscosity to make a filament having a good shape. A polymer having an intrinsic viscosity above 2.5 dl/g has too high a melt viscosity to make a filament having a good shape. Moreover, it requires a higher spinning temperature and fails to make a filament having a good resistance to hydrolysis.

The use of a purified catalyst makes it possible to produce poly(p-dioxanone) having a high intrinsic viscosity and thereby a high molecular weight as compared with what is obtained by using a commercially available catalyst without purifying it, even if the monomer molar ratio to the initiator (hereinafter referred to as M/I) may be equal. Compare Examples 1 and 2 with Comparative Example 1, or compare Comparative Examples 2 and 4. Moreover, the polymer produced by using a purified catalyst gives a spun filament which is superior in hydrolysis resistance to any product of a polymer obtained by using a commercially available catalyst without purifying it, and having the same intrinsic viscosity. If polymerization is carried out at a lower temperature after stirring is stopped when there has been a specific increase in stirring load, there is obtained poly(p-dioxanone) having a higher intrinsic viscosity and a higher molecular weight than those of any polymer obtained without making any such control based on the stirring load, if the monomers have an equal M/I value and are polymerized in the presence of a catalyst purified by distillation. Compare Examples 1 to 3 with Comparative Examples 3 and 4.

There is hardly any difference in intrinsic viscosity between a polymer produced by adding a dye and a polymer produced without adding any dye, while the monomers have an equal M/I value and are polymerized without having any control based on the stirring load. Compare Comparative Examples 3 and 4. The addition of a dye is effective for plasticization as for preventing gelation.

The polymer has its molecular weight governed by the amounts of the initiator, etc. The initiator, etc. mean water and the initiator. The M/I value is obtained by dividing the total number of mols of the monomer by the number of mols of the initiator, etc. After the water content of the monomer has been measured, the amount of the initiator to be added is determined from a separately prepared working curve.

Description will now be made of a method of producing a monofilament of poly(p-dioxanone) as produced by the method described above. The spinning of a filament is preceded by the removal of the monomer from the polymer and the drying of the polymer. It is desirable to remove impurities from poly(p-dioxanone) as far as possible. It is desirable to minimize any substance promoting hydrolysis, such as water and the monomer. The polymer preferably has a monomer content not exceeding 0.5 percent, and more preferably not exceeding 0.1 percent, both by weight.

The monomer can be removed by any method if a packed container can be heated at a reduced pressure by a heating medium supplied therethrough. For example, (1) a column having a heated surface is packed with poly(p-dioxanone), and the monomer is stripped with hot dry nitrogen, etc. through the bottom of the column at a reduced pressure, or (2) a rotary conical dryer having a heated surface is used for stripping with hot dry nitrogen, etc. at a reduced pressure. The method as described at (1) is effective and convenient for any job on a small scale. The method as described at (2) is effective for a job having a large scale involving a weight of 5 kg or more. By these methods, poly(p-dioxanone) from which the monomer has been removed can be obtained. A heating temperature of 60 to 80° C. may be employed. A range of 60 to 70° C. is preferred. The flow rate of nitrogen, or other inert gas depends on the exhaust capacity of a vacuum pump and the size of the container and too high a flow rate results in the failure to obtain a satisfactorily high vacuum degree and achieve any desired target. A flow rate not exceeding 0.5 liter per minute is preferred. A flow rate not exceeding, say, 0.3 liter per minute is still more desirable. A reduced pressure not exceeding 10 mm Hg is preferred. The poly(p-dioxanone) from which the monomer has been removed as described is suitable as a spinning material.

The monofilament according to this invention is produced by spinning the poly(p-dioxanone) described above and drawing a spun filament. Any known method can be used for spinning and for drawing as well. If a monofilament is produced by melt spinning, a spinning temperature of 125 to 165° C. is preferred. At a temperature below 125° C., the polymer has too high a melt viscosity to be spun. Above 165° C., the polymer is decomposed and can form only a monofilament of low strength. A solution of the polymer can be prepared for solution spinning. Tetrachloroethane can, for example, be used as a solvent. Spinning is carried out at a temperature below the boiling point of the solvent. The solution preferably has a concentration of 10 to 30 percent by weight. Melt spinning is, however, preferred from an economical standpoint.

An unstretched filament is made by spinning, and is drawn to make a monofilament having a straight tensile strength of 50,000 psi or higher. A drawing temperature of 60 to 110° C. and a draw ratio of three to eight times are preferred. A two-step drawing process is preferred. The first and second steps of drawing are carried out to stretch a filament by a total amount covered by the draw ratio stated above. No satisfactorily high tensile strength can be obtained at any draw ratio below three. At a draw ratio above eight, whitening makes it impossible to obtain a stretched filament of satisfactorily high strength. Moreover, too high a draw ratio is undesirably likely to make a broken monofilament.

The monofilament according to this invention is relaxed by 80 to 90 percent at a temperature of 60 to 110° C. after it has been drawn as described. Then, it is heat treated at a temperature preferably in the range of 80° C. to below the melting point of poly(p-dioxanone), or more specifically in the range of, say, 80 to 100° C. The treatment is preferably continued for a period of, say, one to 24 hours. Usually, the treatment is carried out under a proper tension in a state that the monofilament is wound around a bobbin, etc. Then, the monofilament is tested for hydrolysis. The monofilament containing a dye is definitely superior in hydrolysis resistance to the monofilament of Ethicon known as PDSII and having the same viscosity.

The monofilament according to this invention has a straight tensile strength of 50,000 psi or higher, and preferably 60,000 psi or higher. It has a knot tensile strength of 30,000 psi or higher, and preferably 40,000 psi or higher. It has a Young's modulus not exceeding 290,000 psi, and preferably not exceeding 220,000 psi. It has an elongation not exceeding 60 percent, and preferably not exceeding 40 percent. It has a diameter of 4 to 40 mils. It has a knot tensile strength retention of 58 percent or higher after four weeks of immersion in a physiological saline solution at 37° C. The monofilament having the properties as described is suitable for use as, for example, an absorbable surgical suture, particularly for stitching a wound or incision which requires a long time for healing.

EXAMPLES

The invention will now be described by way of examples which are not intended for limiting the scope of this invention. The following is an explanation of the methods employed for determining the physical properties as stated in the description of the examples.

1. Amount of the Remaining Monomer (Percent by Weight)

After a working curve is prepared for a monomer having a known concentration, 0.3 g of a copolymer as produced is dissolved in 10 ml of hexafluoroisopropanol (HFIP), and the amount of the monomer remaining therein is determined by gas chromatography with a Model 163 gas chromatograph of Hitachi Limited, a capillary column, cp-sil 5CB, 50 m by 0.32 mm dia., a column temperature of 170° C.

2. Intrinsic Viscosity (dl/g)

0.025 g of copolymer is dissolved in 25 ml of HFIP to prepare an HFIP solution having a concentration of 0.1 g/dl, and the viscosity of the solution is determined at 25° C. by a Ubbelohde 1B viscometer, and the intrinsic viscosity of the polymer ($\eta$: dl/g) is calculated by equation (1)

$$\eta = (1nt/t_0)/C \tag{1}$$

wherein t is the dropping time (sec) of the polymer solution, $t_0$ is the dropping time (sec) of the solvent, and C is the concentration of the solution (g/dl).

3. Tensile Strength and Knot Tensile Strength (kpsi)

These properties are determined by employing a tensile testing machine (Tensilon RTA-100 of Orientic Co., Ltd.) at a chuck gap width of 130 mm and a crosshead speed of 250 mm per minute in accordance with the method specified by the European Pharmacopoeia Commission. A specimen for a knot tensile strength test is prepared by forming a single knot on a filament and mounting it in such a way that the knot may be situated in the center of a clamp. The Young's modulus is calculated by an equation below from the gradient of the initial linear elastic region of a stress-strain curve as obtained. The tensile strength and Young's modulus are both obtained in kg/mm$^2$, but will be converted and shown in kpsi.

$$\text{Young's modulus} = (\tan\theta \times L \times C \times S)/(H \times A)$$

wherein $\theta$ is the angle (deg.) between the initial linear part of the stress-strain curve and the x (strain) axis, L is the chuck distance (mm), C is the chart speed (mm/min.), S is the load (kg/mm) per graduation on the y (stress) axis, H is the crosshead speed (mm/min.), and A is the initial cross-sectional area (mm$^2$) of the filament.

4. Knot Tensile Strength Retention (Percent)

A specimen is dipped in a physiological saline solution (as obtained by dissolving 9.0 g of sodium chloride in distilled water to make a total of 1,000 ml), and after 7, 14, 21 or 28 days, its knot tensile strength is determined as described before, and compared with that of a specimen not dipped therein, and its retention is calculated.

5. Melting Point of Catalyst (°C.)

A specimen weighing 6.8 to 7.0 mg is wrapped in an aluminum pan, and left to stand in a freezer having a temperature of −5° C. a whole day and night. It is placed in a DSC (Model DSC-8230 of RIGAKU Co., Ltd.) having an initial temperature set at −67° C. Its temperature is raised from −67 to 100° C. at a rate of 5° C. per minute, and the temperature at which the specimen shows its melting peak is recorded as its melting point. Alumina is used as a standard substance.

Preparatory Example 1

Purification of Stannous 2-ethylhexanoate by Distillation

A 100 ml four-necked flask having a thermometer well and a capillary for introducing nitrogen was charged with 109 g of commercially available stannous 2-ethylhexanoate (Nikka Octic Tin 28 Percent of Nippon Kagaku Sangyo Co., Ltd.) and its simple distillation was carried out at a reduced pressure of 0.25 to 0.3 mm Hg. The column top temperature, amount of fraction and its weight percentage were 93 to 95° C., 9.5 g and 8.7 percent, respectively, in the case of a first fraction, and 180 to 200° C., 88.2 g and 80.9 percent in the case of a second fraction, while there was a still residue weighing 7.0 g and amounting to 6.4 percent by weight. The second fraction formed a white crystal at 0° C. It had a melting point of −3° C. The second fraction will be referred to as the purified catalyst.

Example 1

A 300 ml reaction flask was charged with 298.2 g (2.921 mols) of distilled p-dioxanone (PDO) having a water content of 27.7 ppm by an injection needle having two cut ends in the presence of a nitrogen atmosphere so that no more water might enter it, and the flask was further charged with 0.004 mol percent of a purified catalyst (0.21 ml of a solution obtained by adding 0.6 g of purified catalyst to 2 ml of toluene for high-performance liquid chromatography, product of Wako Junyaku) and 0.068 mol percent of lauryl alcohol (taking the molar quantity of water into account and giving an M/I value of 1,200). The flask had a stirrer (product of EYELA, Model MAZELA Z-1310, having a maximum stirring load of 10 kgf·cm) and was left at a pressure not exceeding 1 mm Hg for 60 minutes at room temperature, while its contents were stirred by the stirrer rotating at a speed of 60 rpm. Then, it was heated from room temperature to 60° C. at a reduced pressure and the reduced pressure was thereafter released. Its temperature was further raised to 95° C. in the presence of a nitrogen atmosphere under stirring at the same rotating speed, and the rotating speed of the stirrer was changed to 5 rpm to start polymerization. It took two hours to raise the flask temperature from room temperature to 95° C. A recorder (Model μRI00 of Yokogawa Electric) showed an initial stirring load of 0.006 V (5 V corresponds to 10 kgf·cm). The upper limit of the load caused by viscosity was set at 0.008 V (33 percent over the initial load), so that stirring might be stopped upon occurrence of any higher load. The polymerization temperature was automatically controlled by a temperature controller (Model REX-P100 of Rikagaku Kogyo Co., Ltd.) so as to change to a different control pattern upon appearance of a signal for stopping stirring. The polymerization was considered as started when a temperature of 95° C. was reached, and stirring was stopped four hours thereafter. Then, the polymerization was continued at 80° C. in a solid phase, and terminated after six days.

Then, the reactor was rapidly cooled by liquid nitrogen, and poly(p-dioxanone) was removed from it, and frozen and crushed by a Morita crushing machine (Model JC-2). The polymer was dried in a vacuum dryer at room temperature for 12 hours to yield 290 g of a crushed product. It was subjected to 36 hours of treatment for monomer removal in a column having a capacity of 400 ml and held at a temperature of 63° C. and under a reduced pressure of 8 mm Hg, while nitrogen heated to the same temperature was caused to flow therethrough at a rate of 200 ml/min. The resulting polymer had an unreacted monomer content not exceeding 0.1 percent by weight. It had an intrinsic viscosity of 2.31 dl/g. It had a weight of 280 g. The polymer lost by adhering to the reactor, and during crushing and after-treatment amounted to a total of 12.3 g, and the remaining product showed a polymer conversion of 98 percent by weight. It had a melting point of 115° C.

Example 2

Poly(p-dioxanone) was produced by altering the amounts of PDO, lauryl alcohol (LAOH) and the purified catalyst and the water content of PDO as shown in Table 1, and otherwise repeating Example 1. The reproducibility of the results of the invention was confirmed.

Example 3

Poly(p-dioxanone) was produced by altering the amounts of PDO, LAOH and the purified catalyst and the water content of PDO as shown in Table 1, adding 0.13 percent by weight of a dye—D & C Violet No. 2 (CAS No. 81-48-1)—to PDO, and otherwise repeating Example 1.

Examples 4 to 6

Poly(p-dioxanone) was produced by altering the amounts of PDO, LAOH and the catalyst, and the water content of PDO as shown in Table 1, and otherwise repeating Example 3.

Comparative Example 1

Poly(p-dioxanone) was produced by using commercially available stannous 2-ethylhexanoate (Nikka Octic Tin 28 Percent of Nippon Kagaku Sangyo Co., Ltd.) as an unpurified catalyst, altering the amounts of PDO and LAOH and the water content of PDO as shown in Table 2, and otherwise repeating Example 1.

Comparative Example 2

Poly(p-dioxanone) was produced by using an unpurified catalyst as described above, altering the amounts of PDO and LAOH and the water content of PDO as shown in Table 2, continuing stirring for 12 hours after the start of the polymerization, stopping it upon increase of the stirring load by 3,300 percent and otherwise repeating Example 1.

Comparative Example 3

Poly(p-dioxanone) was produced by altering the amounts of PDO, LAOH and the purified catalyst and the water content of PDO as shown in Table 2, stopping stirring upon increase of the stirring load by 3,500 percent and otherwise repeating Example 1 and Comparative Example 2.

Comparative Example 4

Poly(p-dioxanone) was produced by altering the amounts of PDO, LAOH, the purified catalyst and dye D&C Violet No.2 (CAS No.81-48-1) and the water content of PDO as shown in Table 2, stopping stirring upon increase of the stirring load by 2,300 percent and otherwise repeating Example 3 and Comparative Example 2.

The results of Examples 1 to 6 are shown in Table 1, and the results of Comparative Examples 1 to 4 in Table 2.

TABLE 1

|  | Example 1 | Example 2 | Example 3 | Example 4 | Example 5 | Example 6 |
|---|---|---|---|---|---|---|
| PDO (g) | 298.2 | 268.2 | 323.0 | 321.3 | 324.0 | 304.7 |
| (mol) | 2.921 | 2.627 | 3.164 | 3.147 | 3.174 | 2.985 |
| water (ppm) | 27.7 | 123.5 | 60.5 | 75.8 | 64.5 | 199.9 |
| (mol %) | 0.016 | 0.070 | 0.034 | 0.043 | 0.037 | 0.113 |
| LAOH (g) | 0.368 | 0.065 | 0.289 | 0.114 | 0.079 | 0.065 |
| (mol %) | 0.068 | 0.013 | 0.049 | 0.020 | 0.013 | 0.012 |
| M/I value | 1200 | 1200 | 1200 | 1600 | 2000 | 800 |
| catalyst | purified | purified | purified | purified | purified | purified |
| (mol %) | 0.004 | 0.004 | 0.004 | 0.004 | 0.004 | 0.004 |
| addition of dye | no | no | yes | yes | yes | yes |
| (wt %) | 0 | 0 | 0.13 | 0.13 | 0.13 | 0.13 |
| control of stirring | yes | yes | yes | yes | yes | yes |
| increase of stirring load when stirring stopped (%) | 33 | 33 | 33 | 33 | 33 | 33 |
| intrinsic viscosity (dl/g) | 2.31 | 2.28 | 2.05 | 2.25 | 2.51 | 1.71 |
| remaining monomer (wt %) | $\leq 0.1$ | $\leq 0.1$ | $\leq 0.1$ | $\leq 0.1$ | $\leq 0.1$ | $\leq 0.1$ |

TABLE 2

|  | Comparative Example 1 | Comparative Example 2 | Comparative Example 3 | Comparative Example 4 |
|---|---|---|---|---|
| PDO (g) | 306.2 | 293.8 | 311.1 | 315.3 |
| (mol) | 2.999 | 2.878 | 3.047 | 3.089 |
| water (ppm) | 30.1 | 29.9 | 41.8 | 29.5 |
| (mol %) | 0.017 | 0.017 | 0.024 | 0.017 |
| LAOH (g) | 0.370 | 0.356 | 0.339 | 0.383 |
| (mol %) | 0.066 | 0.066 | 0.060 | 0.067 |
| M/I value | 1200 | 1200 | 1200 | 1200 |
| catalyst | non-purified | non-purified | purified | purified |
| (mol %) | 0.004 | 0.004 | 0.004 | 0.004 |
| addition of dye | no | no | yes | no |
| (wt %) | 0 | 0 | 0.13 | 0 |
| control of stirring | yes | no | no | no |
| increase of stirring load when stirring stopped (%) | 33 | 3300 | 3500 | 2300 |
| intrinsic viscosity (dl/g) | 1.98 | 1.32 | 1.86 | 1.93 |
| remaining monomer wt % | $\leq 0.1$ | $\leq 0.1$ | $\leq 0.1$ | $\leq 0.1$ |

Example 7

An unstretched monofilament was spun at an extruding temperature of 155° C. from the poly(p-dioxanone) according to Example 1. The extruder had a nozzle diameter of 1.0 mm. The monofilament was stretched in a draw ratio of 4.0 times at a temperature of 90° C., and further in a draw ratio of 1.5 times at 110° C. The stretched monofilament was relaxed by 90percent at 110° C., and was given six hours of heat treatment at 90° C. Then, its straight and knot tensile strengths, elongation and Young's modulus were determined, and are shown in Table 3.

Examples 8 and 9 and Comparative Examples 5 to 8

Monofilaments were produced by using the polymers shown in Table 3 and otherwise repeating the spinning, stretching, relaxing and heat treating procedures of Example 1, and were likewise tested. The results are shown in Table 3.

Comparative Examples 9 and 10

Sutures commercially available as PDSII, products of Ethicon containing a dye, were examined for physical properties. The results are shown in Table 3.

Comparative Example 11

A suture commercially available as PDSII, a clear product of Ethicon not containing any dye, was examined for physical properties. The results are shown in Table 3.

TABLE 3

|  | Example 7 | Example 8 | Example 9 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|
| polymer used | Example 1 | Example 2 | Example 3 | Comparative Example 1 | Comparative Example 2 | Comparative Example 3 | Comparative Example 4 | PDSII | PDSII | PDSII |
| spinning temperature (° C.) | 160 | 160 | 155 | 155 | 140 | 145 | 155 | — | — | — |
| drawing temperature (° C.) | 110 | 100 | 100 | 95 | 70 | 70 | 85 | — | — | — |
| drawing ratio (times) | 6.0 | 6.0 | 5.8 | 5.8 | 4.0 | 4.5 | 5.8 | — | — | — |
| relaxation temperature (° C.) | 110 | 90 | 85 | 85 | 70 | 70 | 85 | — | — | — |
| relaxation (%) | 90 | 90 | 90 | 90 | 90 | 90 | 90 | — | — | — |
| heat treatment temperature (° C.) | 90 | 90 | 90 | 90 | 90 | 90 | 90 | — | — | — |
| time (hr) | 6 | 6 | 6 | 6 | 6 | 6 | 6 | — | — | — |
| diameter (mils) | 15 | 16 | 15 | 14 | 14 | 14 | 15 | 18 | 12 | 12 |
| intrinsic viscosity (dl/g) | 2.08 | 2.05 | 1.98 | 1.83 | 1.15 | 1.7 | 1.8 | 2.0 | 2.0 | 2.0 |
| straight tensile strength (kpsi) | 74.3 | 73.5 | 72.1 | 63.8 | 46.2 | 51.2 | 34.7 | 55.0 | 78.8 | 81.4 |
| Young's Modulus (kpsi) | 211 | 212 | 209 | 211 | 201 | 210 | 202 | 174 | 248 | 210 |
| elongation (%) | 32.3 | 40.1 | 35.9 | 32.6 | 38.7 | 42.4 | 37.3 | 52.6 | 54.9 | 52.4 |

TABLE 3-continued

|  | Example 7 | Example 8 | Example 9 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|
| knot tensile strength (kpsi) | 48.5 | 48.6 | 47.6 | 47.8 | 39.4 | 41.5 | 47.6 | 46.7 | 50.3 | 58.3 |
| knot tensile strength retention (%) | | | | | | | | | | |
| 7 days | 98.7 | 98.2 | 97.6 | 78.6 | 58.6 | 68.6 | 80.1 | 85.0 | 90.0 | 65.0 |
| 14 days | 89.3 | 89.2 | 90.0 | 69.5 | 40.5 | 43.5 | 68.0 | 81.0 | 85.0 | 58.2 |
| 21 days | 70.4 | 69.2 | 78.3 | 63.2 | not measured | not measured | 60.3 | 71.1 | 65.1 | 43.0 |
| 28 days | 60.2 | 59.1 | 65.0 | 49.1 | — | — | 45.0 | 56.5 | 56.9 | 28.5 |

As is obvious from Table 3, the filament of Example 9 has an improved hydrolysis resistance over the products of Comparative Examples 9 and 10 despite the fact that they are almost equal in intrinsic viscosity and therefore in molecular weight. Likewise, the filaments of Examples 7 and 8 have an improved hydrolysis resistance over the product of Comparative Example 11 despite the fact that they are almost equal in intrinsic viscosity and therefore in molecular weight.

EFFECT OF THE INVENTION AND POSSIBILITY FOR USE IN INDUSTRY

The monofilament spun and stretched using poly(p-dioxanone) obtained by the method according to this invention is slow in hydrolysis as compared with those of the existent poly(p-dioxanone) and hence, is superior for use as surgical suture for stitching a wound or incision which requires a long time for healing. Thus, the poly(p-dioxanone) obtained by the method of this invention is very useful as an absorbable surgical suture in the form of a monofilament.

What is claimed is:

1. A method of producing poly(p-dioxanone) by the ring opening polymerization of p-dioxanone in the presence of a catalyst and an initiator, which comprises the steps of starting the ring opening polymerization of p-dioxanone in a liquid phase under stirring at a temperature of 85 to 105° C. after adding 0.002 to 0.005 mol percent of stannous 2-ethylhexanoate forming a white crystal at a temperature of 0° C. as the catalyst and 0.01 to 0.1 mol percent of initiator thereto, and stopping stirring when a stirring load has increased by 10 to 100 percent over an initial load, while lowering the temperature to a range of 65 to 85° C., to continue the polymerization in a solid phase.

2. The method of claim 1, wherein the p-dioxanone has a water content lower than about 150 ppm.

3. The method of claim 1, wherein stannous 2-ethylhexanoate has a melting point of at least about −3° C.

4. The method of claim 1, wherein stannous 2-ethylhexanoate is a product obtained by the distillation of a commercially available product at a pressure of 0.25 to 0.3 mm Hg and a column top temperature of 180 to 200° C.

5. The method of claim 1, wherein stirring is stopped when the stirring load has increased by 20 to 80 percent from an initial stirring load.

6. The method of claim 1, further including exposing a product of the polymerization in a solid phase to an inert gas at a temperature of 60 to 80° C. and a pressure below about 10 mm Hg to remove unreacted p-dioxanone from it so that its unreacted monomer content is lower than about 0.5 percent by weight.

7. The method of claim 1, wherein the polymerization is continued until poly(p-dioxanone) conversion of more than about 95 percent by weight is attained.

8. The method of claim 1, wherein poly(p-dioxanone) has an intrinsic viscosity of 1.8 to 2.5 dl/g at 25° C.

9. A method of producing a monofilament of poly(p-dioxanone) comprising the steps of melt spinning a filament of poly(p-dioxanone) at a temperature of 125 to 165° C., drawing the filament in a draw ratio of 3 to 8 at a temperature of 60 to 110° C., relaxing it by 80 to 90 percent at a temperature of 60 to 110° C., and heat treating it at a temperature of 80 to 100° C. for a period of 1 to 24 hours, wherein poly(p-dioxanone) is produced by the method of claim 1.

10. The method of claim 9, wherein the monofilament has a diameter of 4 to 40 mils.

* * * * *